United States Patent [19]

Michaud et al.

[11] 4,309,206
[45] Jan. 5, 1982

[54] PROCESS FOR THE PRODUCTION OF ODORLESS PRILLED UREA-DICYANDIAMIDE FERTILIZERS

[75] Inventors: Horst Michaud; Heinrich Röck; Josef Seeholzer, all of Trostberg, Fed. Rep. of Germany

[73] Assignee: SKW Trostberg Aktiengesellschaft, Trostberg, Fed. Rep. of Germany

[21] Appl. No.: 191,281

[22] Filed: Sep. 26, 1980

Related U.S. Application Data

[63] Continuation of Ser. No. 19,554, Mar. 12, 1979, abandoned, which is a continuation of Ser. No. 876,481, Feb. 2, 1978, abandoned.

[30] Foreign Application Priority Data

Apr. 1, 1977 [DE] Fed. Rep. of Germany ....... 2714601

[51] Int. Cl.$^3$ ............................................. C05C 9/00
[52] U.S. Cl. ........................................ 71/28; 71/64.3; 71/64.6; 71/119
[58] Field of Search .................................. 71/3, 28–30, 71/27, 119, 64.3, 64.6; 260/555 C, 551 C

[56] References Cited

U.S. PATENT DOCUMENTS

| | | | |
|---|---|---|---|
| 154,092 | 8/1874 | Scott | 71/3 |
| 3,565,599 | 2/1971 | Sor et al. | 71/28 |
| 3,802,903 | 4/1974 | Shonk et al. | 71/28 X |
| 4,073,633 | 2/1978 | Young | 71/28 |

FOREIGN PATENT DOCUMENTS

| | | | |
|---|---|---|---|
| 2051935 | 5/1971 | Fed. Rep. of Germany . | |
| 2454282 | 5/1975 | Fed. Rep. of Germany | 71/64.6 |
| 47-33905 | 8/1972 | Japan | 71/64.3 |

*Primary Examiner*—S. Leon Bashore
*Assistant Examiner*—Ferris H. Lander
*Attorney, Agent, or Firm*—Curtis, Morris & Safford

[57] ABSTRACT

Odorless prilled urea-dicyandiamide fertilizers are produced by melting a mixture of urea and dicyandiamide containing 5% to 35% by weight of dicyandiamide nitrogen, based on the total nitrogen of the mixture, at a temperature below 135° C. and then prilling the molten material to form a free-flowing globular product.

10 Claims, No Drawings

PROCESS FOR THE PRODUCTION OF ODORLESS PRILLED UREA-DICYANDIAMIDE FERTILIZERS

This is a continuation of application Ser. No. 19,554 filed Mar. 12, 1979, and now abandoned, which is in turn a continuation of application Ser. No. 876,481 filed Feb. 2, 1978, now abandoned.

This invention relates to the production of odorless prilled urea-dicyandiamide fertilizers.

It is known that the transportation and storage properties of fertilizer urea can be improved by forming droplets of molten urea and prilling, i.e., converting the molten material into solid globules. For this purpose the urea is melted, broken up into droplets by suitable apparatus, cooled in free fall in a so-called prilling tower, and caused to solidify into globules. The resultant globular granules have less tendency to agglomerate than finely granular crystals and can be recovered more easily. Additives, for instance oily substances, further inhibit agglomeration and facilitate the recovery of the product granules.

Urea melts at 132.7° C. Noticeable spitting off of ammonia occurs at 100° C. and at the melting point considerable ammonia is split off in accordance with the following equation:

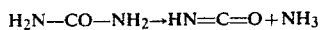

Other decomposition products are $CO_2$ and $H_2O$. The isocyanic acid produced in accordance with the above equation reacts with urea to form biuret.

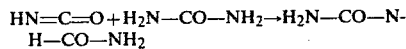

The latter acts in large admixtures as a plant poison and should not be present in an amount of more than, e.g., 2% in urea fertilizers which are used for the fertilizing of the soil and should not exceed a concentration of 1% for leaf fertilizing.

The use of dicyandiamide as a nitrification inhibitor is known. In experimental fertilizings it has been found that nitrogen fertilizers exhibit good inhibition of nitrification when the proportion of dicyandiamide nitrogen reaches about 10% by weight of the total nitrogen content of the fertilizer mixture. Therefore the percentage of dicyandiamide in a urea-dicyandiamide mixture should be of this order of magnitude. For example, the most widely used mixture of 7.3 parts by weight of dicyandiamide and 92.7 parts by weight of urea contains 10% by weight of dicyandiamide nitrogen and 90% by weight of urea nitrogen.

Homogeneous mixtures of urea with an additive substance are most easily obtained by introducing the additive substance into the molten urea. In the case of dicyandiamide, however, considerable difficulties are encountered, since in such cases the decomposition of the urea increases and the splitting-off of ammonia becomes considerably greater as compared with pure urea. For example, while urea at a temperature of the molten bath of 140° C. shows within five hours a loss of weight of 4.41% and a nitrogen loss of 5.42%, the mixture of 92.7% by weight urea and 7.3% by weight dicyandiamide under the same conditions shows a loss in weight of 5.92% and a nitrogen loss of 7.18%.

Furthermore, the urea dicyandiamide mixtures obtained by melting at 140° C. have a strong odor of ammonia even after the cooling and prilling, which odor cannot be eliminated even by strong aeration.

Accordingly, an object of the present invention consists in producing urea-dicyandiamide fertilizers in such a manner that there are neither large losses in weight nor in nitrogen and that the granulated globules are free of the odor of ammonia.

We have been surprised to find that upon the melting of urea together with dicyandiamide at temperatures below 135° C. the splitting off of ammonia and the loss in weight of the melt substantially decrease. At 125° C. the losses are only 1/6 to 1/7 of the loss at 140° C. The development of ammonia is considerably decreased at these melt temperatures of 120°–125° C. as compared with the otherwise customary melt temperatures of 140° C., both in the melt and after the cooling.

The invention therefore relates to the production of odorless solid urea-dicyandiamide fertilizers in which urea together with dicyandiamide in amounts to provide 5 to 30% by weight of dicyandiamide nitrogen, based on the total nitrogen of the mixture, is melted at temperatures below 135° C., possibly together with medium-strong to weak acids or their acid salts, and thereafter prilled.

In accordance with the invention the ammonia odor of the resultant melt is slight, provided that one operates at temperatures of 120°–125° C. and that the time of heating of the melt is maintained short. If the duration of heating must be extended because of the apparatus employed, the odor of ammonia can be circumvented by adding small amounts of medium-strong to weak acids to the liquid fertilizer melt. The resulting granular fertilizers are then completely odorless at room temperature.

Suitable acids are, for instance, $H_3BO_3$ and $H_3PO_4$ or acid-reacting salts, such as $NaH_2PO_4$ or $NH_4H_2PO_4$, and also organic acids, such as formic acid and acetic acid, as well as hydroxy carboxylic acids such as glycolic acid, lactic acid, and citric acid, as well as amino acids, for instance glycine. It was surprising to us that strong acids, such as hydrochloric or sulfuric acid, do not act to combine with ammonia in this case.

For the elimination of the ammonia odor, amounts of acid of 0.1–2.5% by weight and preferably 0.5–1.5% by weight based on the weight of the urea-dicyandiamide mixture are sufficient.

As a whole, the following advantages are obtained from the reduced melt temperature of the urea-dicyandiamide mixture and the possible addition of medium-strong to weak acids or their acid-reacting salts:

(a) Less decomposition and therefore less loss in weight,
(b) reduced nitrogen losses,
(c) less by-product formation, particularly less biuret,
(d) substantial preservation of the compound dicyandiamide which acts as nitrification inhibitor,
(e) a prilled urea dicyandiamide fertilizer which is free of the odor of ammonia, and
(f) an increased through-put in the prilling tower due to the lower melt temperature.

The following examples are intended to illustrate and explain the invention and are not intended to limit it.

EXAMPLE 1

A mixture of 92.7 parts by weight of urea and 7.3 parts by weight of dicyandiamide was maintained at a melt for five hours at 125° C. After cooling the mixture exhibited a weight loss of 0.79% and a nitrogen loss of 1.07% as compared with a weight loss of 5.92% and a nitrogen loss of 7.18% when the mixture is heated at 140° C. for 5 hours.

EXAMPLE 2

A mixture of 92.7 parts by weight of urea and 7.3 parts by weight of dicyandiamide was heated to a maximum of 125° C. until a clear melt was obtained and then cooled. The product was crushed in a mortar and finely ground. There was only a slight odor of ammonia. The pH of a 10% aqueous solution was 9.0.

EXAMPLE 3

A mixture of 92.7 parts by weight of urea, parts by weight of dicyandiamide and 0.25 parts by weight of acetic acid (glacial) was heated to 124° C. After a clear melt had been obtained it was cooled, the solidified melt was crushed and finely ground. There was no odor of ammonia; no $NH_3$ was perceptible even upon storing for several weeks at room temperature. The pH of a 10% aqueous solution was 7.6.

EXAMPLE 4

A mixture of 92.7 parts by weight of urea and 7.3 parts by weight dicyandiamide was melted at 125° C. 1 part by weight of $H_3PO_4$ (85%) was added and agitation effected for 2 minutes. After cooling, the solidified melt was crushed. There was no odor of $NH_3$ even after storing for several weeks. The pH of a 10% aqueous solution was 7.5.

EXAMPLE 5

A mixture of 90 parts by weight of urea and 10 parts by weight of dicyandiamide was melted at 125° C., 1 part by weight of $NH_4H_2PO_4$ was added, and stirring was effected for two minutes, followed by cooling. The powdered melt had no odor of $NH_3$ and the pH of a 10% aqueous solution was 7.4.

EXAMPLE 6

A mixture of 92.7 parts by weight of urea, 7.3 parts by weight of dicyandiamide, and 1 part by weight of anhydrous citric acid was heated to 125° C., a clear melt thereby forming. The melt was cooled, crushed in a mortar, and finely ground. No odor of ammonia was perceptible. The pH of a 10% aqueous solution was 8.0. Even after storage for three weeks in a closed glass bottle no $NH_3$ was detectible.

EXAMPLE 7

A mixture of 92.7 parts by weight of urea, 7.3 parts by weight of dicyandiamide and 1 part by weight of lactic acid was heated at 124° C. until a clear melt was obtained. After 10 minutes at 124° C. it was cooled. The crushed melt, a 10% aqueous solution of which had a pH of 7.3, was introduced into a glass bottle. After storage for four weeks no odor of $NH_3$ could be detected.

EXAMPLE 8

A mixture of 90 parts by weight of urea and 10 parts by weight of dicyandiamide was heated to 120° C. After a clear melt had been obtained, one part by weight of glycine (aminoacetic acid) was added, and after stirring for five minutes cooling was effected. The crushed mixture had no odor of $NH_3$. The pH of a 10% aqueous solution was 8.0.

We claim:

1. A method for producing an odorless solid urea-dicyandiamide fertilizer which comprises heating a mixture of urea and dicyandiamide which mixture contains 5–30% by weight of dicyandiamide nitrogen, based on the total weight of nitrogen in the mixture, to form a molten mixture and then prilling the molten mixture, said heating being so carried out that the temperature of said mixture does not exceed 125° C.

2. A method for producing an odorless solid urea-dicyandiamide fertilizer which comprises preparing a mixture of urea and dicyandiamide in such proportions that it contains from 5% to 30% by weight of dicyandiamide nitrogen, based on the total weight of nitrogen in the mixture, heating the mixture under conditions such that its temperature does not exceed 125° C. to convert it to molten form and then prilling the molten mixture.

3. The method defined in claim 1 wherein the temperature of the molten mixture is maintained between 110° and 125° C.

4. The method defined in claim 1 wherein a medium-strong to weak acid is added to the molten mixture in an amount of 0.1 to 2.5% by weight, based on the weight of the fertilizer mixture.

5. The method defined in claim 4 wherein the medium-strong to weak acid is heated together with urea and dicyandiamide or is subsequently added to the molten mixture which contains the urea and dicyandiamide.

6. The method defined in claim 4 wherein the added acid is an inorganic acid or an acid-reacting salt thereof.

7. The method defined in claim 4 wherein the added acid is formic acid or acetic acid.

8. The method defined in claim 4 wherein the added acid is glycolic acid, lactic or citric acid.

9. The method defined in claim 4 wherein the added acid is an amino acid.

10. The method defined in claim 1 wherein the temperature of the molten mixture is between 120° and 125° C.

* * * * *

UNITED STATES PATENT AND TRADEMARK OFFICE
CERTIFICATE OF CORRECTION

PATENT NO. : 4,309,206
DATED : January 5, 1982
INVENTOR(S) : Michaud et al.

It is certified that error appears in the above—identified patent and that said Letters Patent is hereby corrected as shown below:

In the Heading, Item [63], line 3, the date "Feb. 2, 1978" should be --Feb. 9, 1978--;

Column 1, line 9 (approximately), the date "Feb. 2, 1978" should be --Feb. 9, 1978--.

Signed and Sealed this

Twenty-third Day of March 1982

|SEAL|

Attest:

GERALD J. MOSSINGHOFF

*Attesting Officer*    *Commissioner of Patents and Trademarks*